(12) United States Patent
Zhou et al.

(10) Patent No.: US 7,256,570 B2
(45) Date of Patent: Aug. 14, 2007

(54) LIGHT LOAD CURRENT-MODE CONTROL FOR SWITCHED STEP UP-STEP DOWN REGULATORS

(75) Inventors: Xunwei Zhou, San Jose, CA (US); Randy G. Flatness, Los Gatos, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 11/052,473

(22) Filed: Feb. 8, 2005

(65) Prior Publication Data

US 2006/0176035 A1   Aug. 10, 2006

(51) Int. Cl.
G05F 1/613   (2006.01)
(52) U.S. Cl. .................................... 323/224
(58) Field of Classification Search ................ 323/224, 323/283
See application file for complete search history.

(56) References Cited

U.S. PATENT DOCUMENTS

| | | | |
|---|---|---|---|
| 4,618,812 A | 10/1986 | Kawakami | 323/224 |
| 5,001,621 A | 3/1991 | Egawa | 363/132 |
| 5,134,355 A | 7/1992 | Hastings | 323/211 |
| 5,481,178 A | 1/1996 | Wilcox et al. | |
| 5,552,694 A | 9/1996 | Appeltans | 323/222 |
| 5,602,463 A | 2/1997 | Bendall et al. | 323/266 |
| 5,734,258 A | 3/1998 | Esser | 323/224 |
| 5,808,453 A * | 9/1998 | Lee et al. | 323/224 |
| 5,889,392 A | 3/1999 | Moore et al. | 323/282 |
| 6,087,816 A | 7/2000 | Volk | |
| 6,166,527 A * | 12/2000 | Dwelley et al. | 323/222 |
| 6,191,567 B1 | 2/2001 | Sluijs | 323/259 |
| 6,215,286 B1 | 4/2001 | Scoones et al. | 323/222 |
| 6,275,016 B1 | 8/2001 | Ivanov | 323/224 |
| 6,348,779 B1 | 2/2002 | Sluijs | 323/222 |
| 6,411,531 B1 | 6/2002 | Nork et al. | |
| 6,580,258 B2 | 6/2003 | Wilcox et al. | |
| 6,636,431 B2 | 10/2003 | Seki et al. | 363/65 |
| 6,737,838 B2 | 5/2004 | Sluijs et al. | 323/225 |
| 6,765,371 B2 | 7/2004 | Kataoka | 323/222 |
| 6,781,352 B2 | 8/2004 | Athari et al. | 323/222 |
| 6,859,020 B2 | 2/2005 | Baldwin et al. | 323/283 |
| 6,977,488 B1 | 12/2005 | Nogawa et al. | 323/271 |
| 6,984,967 B2 * | 1/2006 | Notman | 323/282 |
| 2002/0145409 A1 | 10/2002 | Umminger et al. | |
| 2004/0085048 A1* | 5/2004 | Tateishi | 323/224 |
| 2004/0239299 A1 | 12/2004 | Vinciarelli | 323/282 |
| 2005/0195622 A1 | 9/2005 | Lehman et al. | 363/17 |
| 2006/0055384 A1 | 3/2006 | Jordan et al. | 323/282 |

OTHER PUBLICATIONS

MAXIM Step-Up/Step-Down Li+ Battery Charger, Maxim Integrated Products, MAX1870 A, pp. 1-32.

(Continued)

*Primary Examiner*—Shawn Riley
(74) *Attorney, Agent, or Firm*—McDermott Will & Emery LLP (57) ABSTRACT

A switched regulator circuit provides step-up and step-down operation at high efficiency during light load conditions. Switching loss is reduced in a four switch arrangement by limiting bottom MOSFET switching frequency. The possibility of overcharge in boost mode operation has been avoided by automatically changing to a buck mode operation in response to sensed parameters.

10 Claims, 6 Drawing Sheets

OTHER PUBLICATIONS

Redl, Richard., et al. "What a Design Engineer Should Know About Current-Mode Control." Design Automation Inc. pp. 18-33.

"Modeling, Analysis and Compensation of the Current-Mode Converter," Unitrode Application Note, U-97, Applications Handbook 1997 Edition, pp. 3-43-3-48.

"Micropower Synchronous Buck-Boost DC/DC Converter." Linear Technology, LTC3440, pp. 1-16.

"No $R_{SENSE}$ Synchronous Step-Up DC/DC Controller." Linear Technology, LTC1700, pp. 1-16.

"High Efficiency Synchronous Step-Down Switching Regulator." Linear Technology, LTC1735, pp. 1-32.

"Wide Operating Range No $R_{SENSE}$™ Step-Down Controller." Linear Technology, LTC1778/LTC1778-1, pp. 1-24.

* cited by examiner

LIGHT LOAD CURRENT-MODE CONTROL FOR SWITCHED STEP UP-STEP DOWN REGULATORS

RELATED APPLICATIONS

This application contains subject matter related to copending U.S. application Ser. No. 11/052,478 of Flatness et al., filed Feb. 8 2005, copending U.S. application Ser. No. 11/052,480 of Flatness et al., filed Feb. 8. 2005, and copending U.S. application Ser. No. 11/052,477 of Flatness et al., filed Feb. 8, 2005, all commonly assigned with the present application. The disclosures of these applications are incorporated by reference herein.

TECHNICAL FIELD

The present disclosure relates to control of regulators, more particularly to switched regulators that can be operated in boost mode, buck mode and buck-boost mode.

BACKGROUND

Voltage regulators are known that can convert from input voltages above, below, or equal to the controlled output voltage, respectively performing buck mode regulation, boost mode regulation, or buck-boost mode regulation. Regulator architecture typically is provided for power supplies in automotive applications, lap-top computers, telecom equipment and distributed power systems. A known "four-switch" buck-boost converter is described in an October 2001 datasheet for the LTC3440 "Micro-power Synchronous Buck-Boost DC/DC Converter" integrated circuit manufactured by Linear Technology Corporation. Two of the four switches are connected to the input side of an inductor, the other switches connected to the output side. In accordance with the level of voltage output to be controlled and the level of voltage input, the regulator has the capability of assuming a plurality of operation states in which the switches variously are sequentially activated or deactivated, to connect the inductor to the input, the output, and/or a common ground connection. The voltage mode control technique used presents difficulty in compensating for boost mode and buck-boost mode closed loop operation.

Other known arrangements are simplifications of the "four-switch" configuration in which two of the switches are replaced by diodes. With such arrangements, control flexibility is lessened as fewer different switch operation states are available. A known variable frequency control technique can be used to apply constant-on time control for buck mode and constant-off time control for boost mode. This technique utilizes a wide switching frequency range and a low system bandwidth. Another known alternative is current mode control, wherein a sense resistor is placed permanently in series with the circuit inductor or two sense resistors are used, one at the input and another at the output.

Light load efficiency is important for battery applications. During conditions of low inductor current, activation of switches in regulators, such as described above, at times becomes unnecessary. Without provision in those systems for identifying and adjusting for such conditions, needless switching operations will occur. A need thus exists for switching regulators that eliminate unnecessary switching, thereby to improve efficiency.

During light load conditions in which the output voltage level is greater than the input voltage, regulation proceeds in a discontinuous current boost mode. As inductor current information is not available during certain switching periods, undesirable negative current levels can occur. A need exists to prevent overcharge at the output.

SUMMARY OF THE DISCLOSURE

The subject matter described herein fulfills the above-described needs of the prior art. A regulator provides step-up and step-down operation in which the level of the input voltage can be greater, equal to, or less than a preset controlled output voltage. An exemplified regulator may be configured to include an inductor, a first switch connected between a first terminal of the inductor and an input terminal, a second switch connected between the first inductor terminal and a common connection, a third switch connected between a second terminal of the inductor and the common connection, and a fourth switch connected between the second inductor terminal and an output terminal. Voltage at the output terminal may be regulated at a level less than the voltage at the input terminal in accordance with a constant frequency clock signal.

During light load conditions, the second and third switches are set to an off state and the fourth switch to an on state prior to a clock pulse. At each clock pulse, the first switch is set to an off state and the second switch is maintained off for a fixed time period. During the fixed time period, the inductor current is sensed. If the sensed inductor current exceeds a first predetermined threshold level, the second switch is turned on after the fixed time period. The second switch is turned off when current falls below a second predetermined threshold level.

The first switch is maintained off until occurrence of an output voltage condition. Upon occurrence of the output voltage condition, the first switch is turned on and remains on until the next clock pulse. The voltage output signal condition occurs when a compensated error signal attains a prescribed voltage level. An error signal, representing the difference between a voltage feedback signal proportional to the voltage at the output terminal and a voltage reference, is combined with the error signal with a buck mode compensation signal to produce the compensated error signal.

In another aspect, the voltage at the output terminal may be regulated during light load conditions at a level greater than the voltage at the input terminal in boost mode operation. The first switch is set to an on state and the second and fourth switches are set to an off state. In response to each clock signal, the third switch is turned on. When the inductor current rises to a boost mode threshold level, the third switch is turned off. Upon the occurrence of an output voltage condition, a buck mode operation is initiated after the third switch turns off. The second and fourth switches are turned on and the first switch is turned off. When the current falls to a buck mode threshold level after turnoff of the third switch, the second switch is turned off and the first switch turned on. The fourth switch is turned off at the beginning of the next clock.

Additional advantages will become readily apparent to those skilled in this art from the following detailed description, wherein only the preferred embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

The switching regulator is capable of providing efficient operation in a buck mode, wherein the input voltage is greater than a preset output voltage, a boost mode, wherein the input voltage is less than a preset output voltage, and a buck-boost mode, wherein the input voltage and preset output voltage are of substantially the same level. The switching regulator is represented in the schematic block diagram of FIG. 1.

Figure 1:
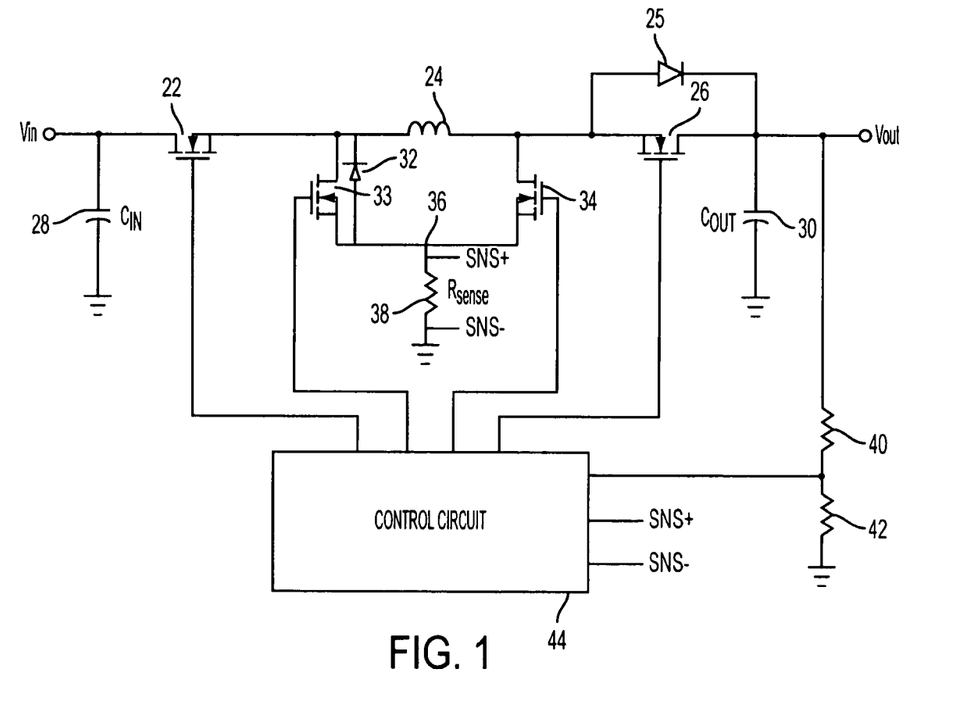
FIG. 1 is a schematic block diagram of a switching regulator in accordance with the present invention.

An input voltage from a power supply is applied to input terminal $V_{in}$. A preset output voltage is regulated at the $V_{out}$ terminal. Connected in series between the input and output terminals are a first switch 22, inductor 24, and a second switch 26. Switches 22 and 26 preferably are MOSFETs, although any controlled switching device may be utilized. Rectifier 25, shown in parallel with switch 26, represents the body-diode of switch 26 and can conduct current in the direction of the output terminal.

An input capacitor 28 is connected between the input terminal and the common ground. An output capacitor 30 is connected between the output terminal and the common ground. Switch 33 and switch 34 are connected across inductor 24 and joined at node 36. Current sense resistor 38 is connected between node 36 and the common ground. Voltage divider resistors 40 and 42 are connected in series between the output terminal and the common ground.

Control circuit 44 has a first input connected to the junction between resistors 40 and 42, thereby to receive an output feedback voltage at resistor 42. The voltage at resistor 42 is proportional to the output voltage. A second input to control circuit 44 receives the voltage across resistor 38, which represents sensed inductor current. In response to these inputs, the control circuit 44 outputs signals for activation and deactivation of switches 22, 26, 33 and 34 for the various modes of operation. Switches 22 and 33 are controlled to be in reciprocal conductive states with respect to each other and switches 26 and 34 are controlled to be in reciprocal conductive states with respect to each other.

Figure 2:
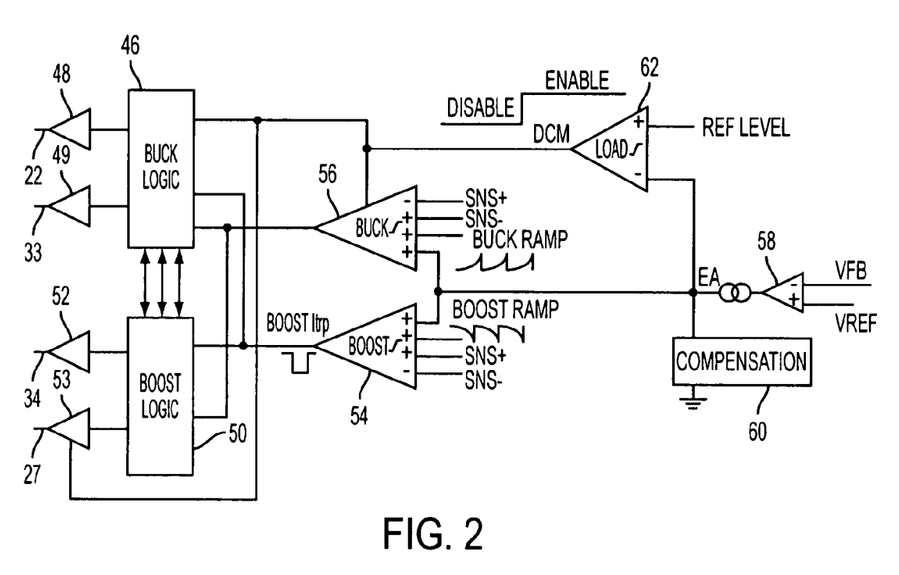
FIG. 2 is a block diagram of a current mode control circuit for the regulator of FIG. 1.

FIG. 2 is a block diagram of the control circuit 44 of FIG. 1. Buck logic circuit 46 outputs signals to switch drivers 48 and 49 that apply driving signals, respectively, to switches 22 and 33. Boost logic circuit 50 outputs signals to switch drivers 52 and 53 that apply driving signals, respectively, to switches 34 and 26. An output of buck comparator 54 is connected to an input of buck logic circuit 46 and an input of boost logic 50. An output of boost comparator 56 is connected to an input of buck logic circuit 46 and an input of boost logic 50.

Error amplifier 58 outputs a signal corresponding to the difference between the output feedback voltage, taken at the junction between resistors 40 and 42, and a reference voltage. This difference signal is applied as an input to buck comparator 54 and boost comparator 56. A buck compensation ramp signal and a boost compensation ramp signal are applied, respectively, to an input of the buck comparator 54 and the boost comparator 56. A compensation circuit 60 is shown connected to the error amplifier output. The compensation circuits may comprise a well-known resistive capacitive arrangement for this purpose, as described, for example, in an article entitled *Modelling, Analysis and Compensation of the Current-Mode Converter*, published in the 1997 edition of Applications Handbook. The compensation signal and difference signal are superimposed and compared by the comparators with the sensed current signal SNS+ SNS−, taken across current sense resistor 38 and applied as additional inputs to the comparators.

Comparator 62 has a first input for receiving the compensated error signal from error amplifier 58. A second input of comparator 62 receives a reference voltage level signal. The output of comparator 62 is coupled to buck comparator 54, to buck logic 46, and to switch driver 53. When the compensated error signal is lower than the voltage reference level, comparator 62 outputs a high level DCM (discontinuous mode) signal. The high level DCM signal enables the buck comparator and disables the boost comparator.

In buck mode operation, the output voltage is regulated to a preset level that is lower than the input voltage. To maintain the preset output voltage, current is continuously applied by the regulator to the output capacitor $C_{OUT}$ at a rate that is controlled in dependence upon sensed conditions. Buck logic circuit 46 outputs signals for turning on and off switches 22 and 33 in response to the output of buck comparator 54, while boost logic circuit 50 maintains switch 34 off throughout the buck mode operation. Boost comparator 56 is disabled at this time. Buck mode operation is implemented with clocked constant frequency switching control. Constant frequency simplifies the design of input and output filters and compensation circuit.

In boost mode operation, the output voltage is regulated to a preset level that is higher than the input voltage. Switch 22 is maintained in an on state throughout the boost mode operation by buck logic circuit 46. Switch 33 is maintained in an off state throughout the boost mode operation. Buck comparator 54 is disabled throughout boost mode operation. Boost logic circuit 50 outputs signals for turning on and off switches 34 and 26 in response to the output of boost comparator 56.

Reference is made to commonly assigned copending application 11/052,480,the entire disclosure of which is hereby incorporated in this disclosure, for a more detailed explanation of these various modes of operation. Explanation of buck-boost operation modes is also presented in the copending application.

Figure 3:
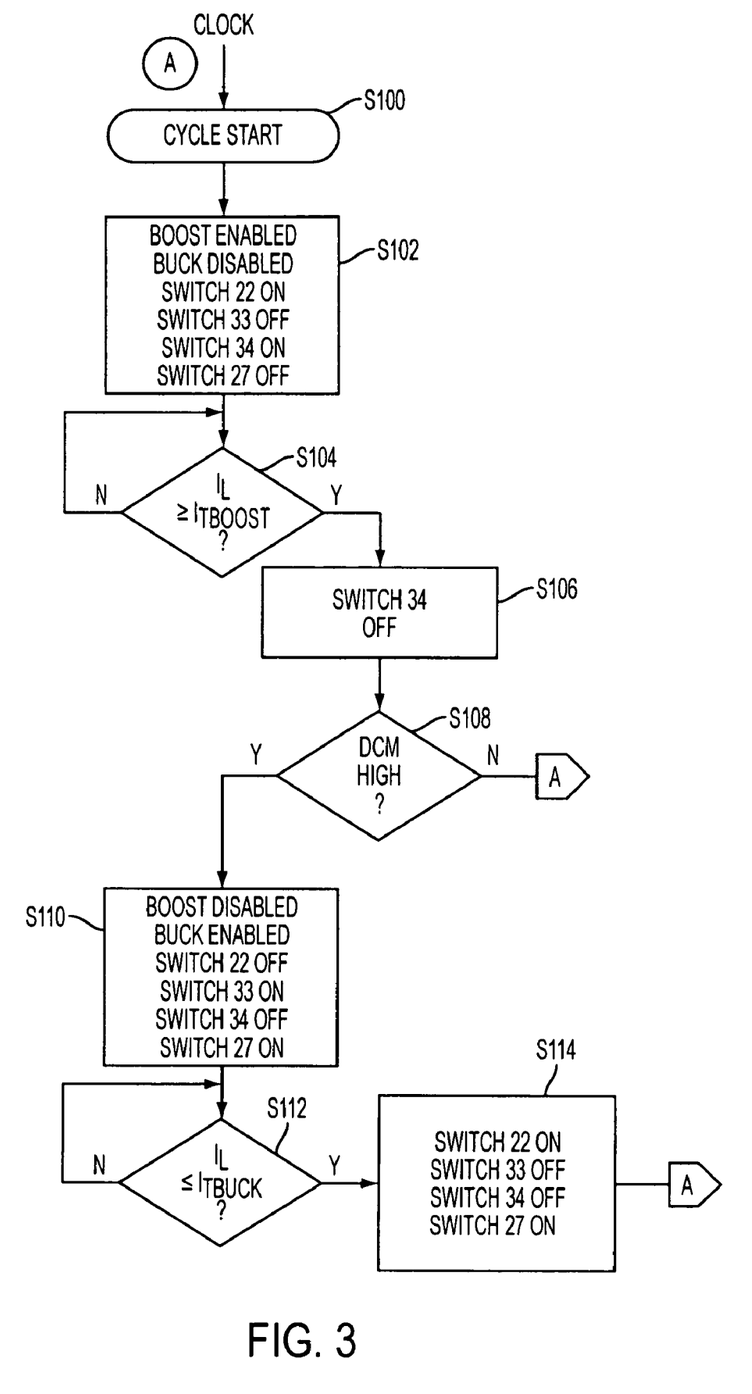
FIG. 3 is a flow chart for boost mode operation of the regulator of FIG. 1 during light load conditions.
Figure 4:
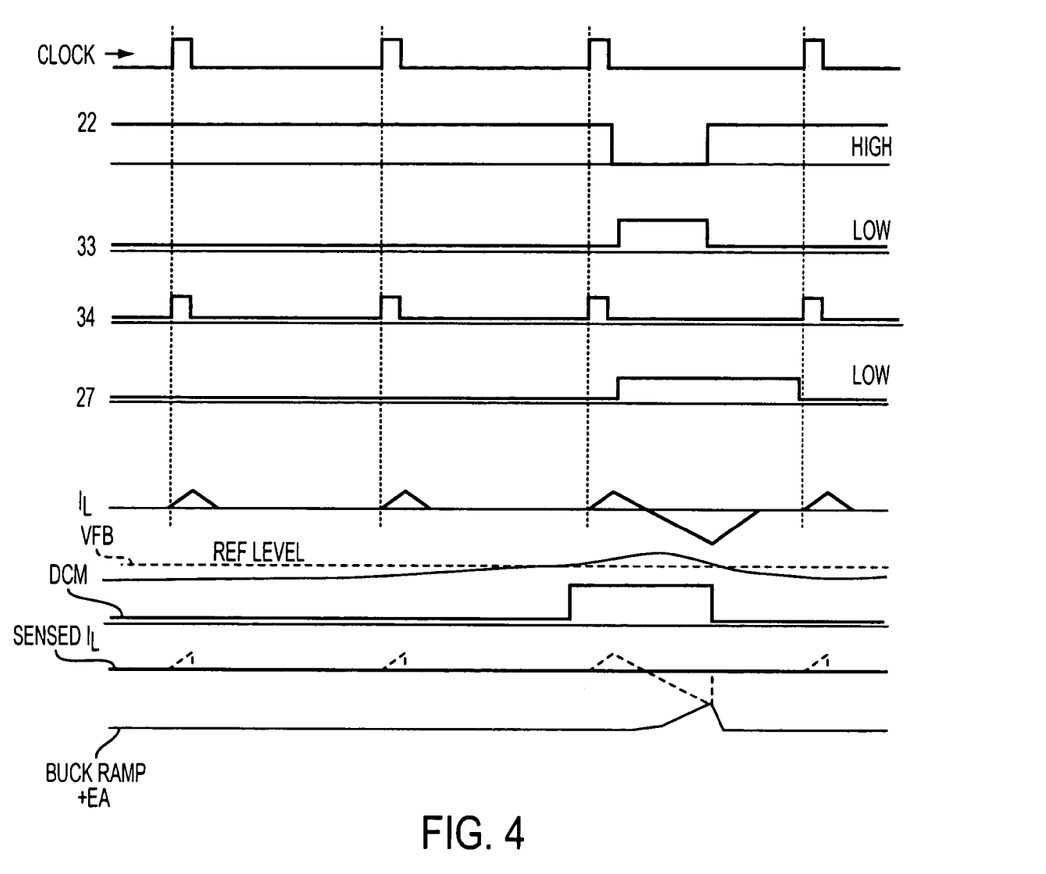
FIG. 4 is a waveform diagram for the boost mode operation flow chart of FIG. 3.

Low load operation of the regulator when the output voltage is higher than the input voltage (boost mode) is described with respect to the flow chart of FIG. 3 and waveforms of FIG. 4. Initially, switch 22 is in a conductive state while switches 33, 34 and 26 are switched off. There is no inductor current at this time. A clock pulse initiates the start of a cycle at step S100. At step S102, the boost comparator is enabled and the buck comparator is disabled. Switch 34 is turned on to connect the inductor between the input terminal, via conductive switch 22, and the common ground. Inductor current increases until the sensed current reaches a boost threshold level $I_{TBOOST}$, as determined at step S104.

At step S106, switch 34 is turned off, leaving only switch 22 in the conductive state. Inductor current flows through diode 25 to the output terminal and decreases to zero. The diode and the open state of switch 26 prevent reversal of current from the high voltage level output. Determination is made at step S108 of whether a high level DCM signal has been output from comparator 62. This signal is high when the compensated error voltage, shown as waveform VFB in FIG. 4, exceeds the voltage reference level. Such event occurs when the charge at the output increases to raise output voltage, and thus the error voltage. If a high level DCM signal has not been generated, the cycle is completed and the operation flow returns to step S100.

If a high level DCM signal has been generated, at step S110 boost comparator 56 is disabled, buck comparator 54 is enabled, switches 22 and 34 are turned off and switches 33 and 26 are turned on. The inductor is now connected between the output terminal and the common ground. Current flow decreases until a buck threshold $I_{TBUCK}$ level is sensed at step S112. As can be seen in FIG. 4, current may reverse in direction to lower the charge at the output and thus the compensated error voltage to the reference level.

At step S114, switches 22 and 26 are turned on and switches 33 and 34 are turned off. The inductor is now connected between the input and the output terminals and remains so connected until the next clock pulse.

Figure 5:
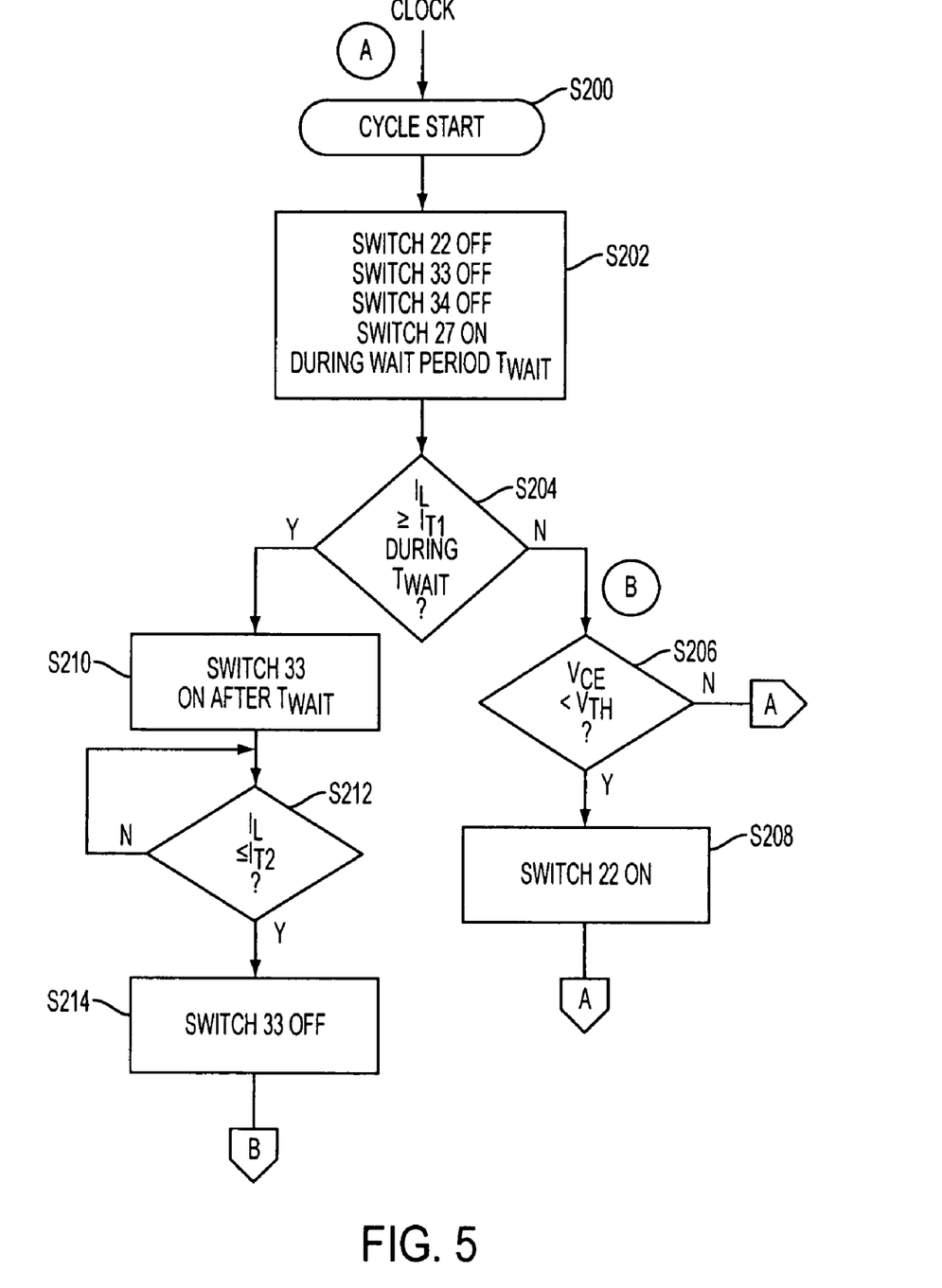
FIG. 5 is a flow chart for buck mode operation of the regulator of FIG. 1 during light load conditions.
Figure 6:
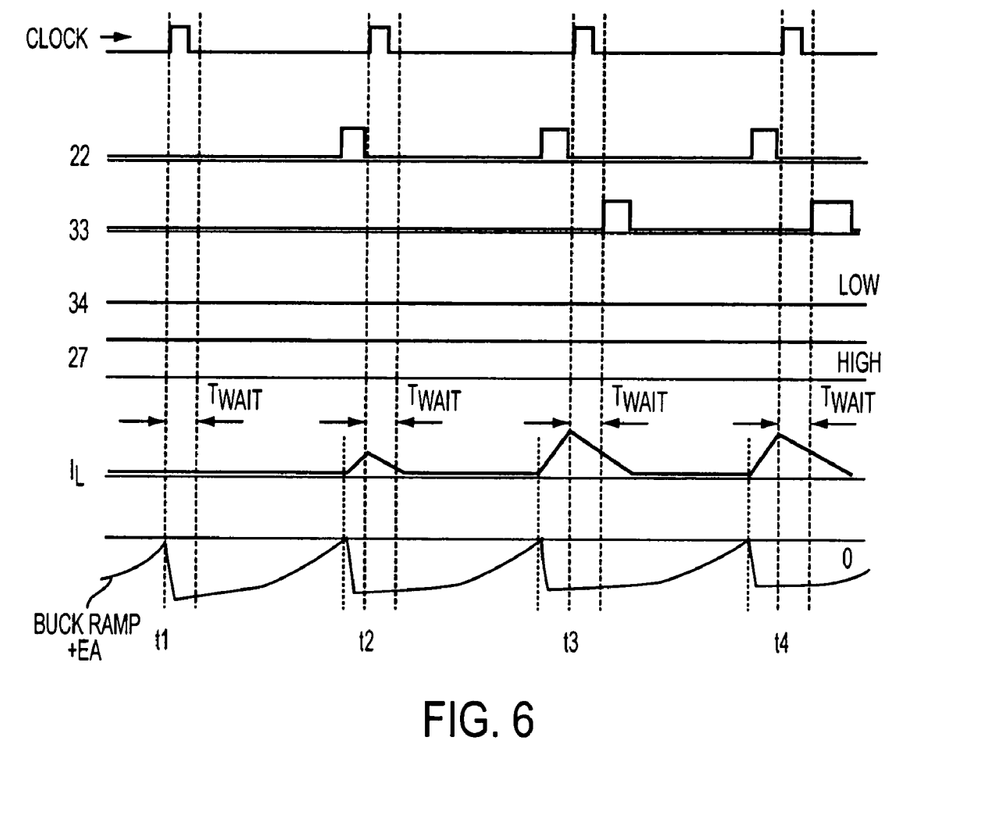
FIG. 6 is a waveform diagram for the buck mode operation flow chart of FIG. 5.

Low load operation of the regulator when the output voltage is lower than the input voltage (buck mode) is described with respect to the flow chart of FIG. 5 and waveforms of FIG. 6. Initially, switch 26 is in a conductive state while switches 22, 33 and 34 are switch off. There is no inductor current at this time. A clock pulse initiates the start of a cycle at step S200. At step S202 the states of the switches are maintained for a wait period $T_{WAIT}$. At step S204, determination is made whether inductor current has reached a first threshold level $I_{T1}$. If not, determination is made at step S206 whether the compensated error signal has attained a reference level. If not, no switching is necessary and operation awaits the next clock signal at S200. If attainment of the reference level has been determined in step S206, at step S208 switch 22 is turned on for the remainder of the cycle. During this time the inductor is connected between the input and output terminals.

If the current sensed during wait period $T_{WAIT}$ has exceeded the level $I_{T1}$, switch 33 is turned on after the $T_{WAIT}$ period at step S210. The inductor at this time is connected between the output terminal and the common ground and the current decreases. Step S212 determines when the sensed current has decreased to a second threshold level $I_{T1}$. This level may be set close to zero. When the current has reached this level, switch 33 is turned off at step S214 and operation flow then proceeds to step S206.

In this disclosure there are shown and described only preferred embodiments of the invention and but a few examples of its versatility. High efficiency at light load buck and boost operations has been attained as switching loss is reduced by limiting the bottom MOSFET switching frequency. The possibility of overcharge in boost mode operation has been avoided. It is to be understood that the invention is capable of use in various other combinations and environments and is capable of changes or modifications within the scope of the inventive concept as expressed herein.

What is claimed is:

1. In a circuit comprising an inductor having first and second terminals, a first switch connected between the first inductor terminal and an input terminal, a second switch connected between the first inductor terminal and a common connection, a third switch connected between the second inductor terminal and the common connection, a fourth switch connected between the second inductor terminal and an output terminal, and a sensing element for sensing inductor current, the sensing element connected between the common connection and a node joining the second switch and the third switch, a method for regulating the voltage at the output terminal at a level less than the voltage at the input terminal, the method comprising the steps of:

setting the second and third switches to an off state and the fourth switch to an on state;

generating a clock signal, at each clock, setting the first switch to an off state and maintaining the second switch off for a fixed time period;

sensing inductor current during the fixed time period;

in response to the sensed inductor current exceeding a first predetermined threshold level, turning on the second switch after the fixed time period;

turning off the second switch when current falls below a second predetermined threshold level; and maintaining the first switch off until occurrence of an output voltage condition.

2. A method as recited in claim 1, further comprising the steps of:

turning on the first switch upon occurrence of the output voltage condition; and maintaining the first switch on until the next clock.

3. A method as recited in claim 2, further comprising the steps of:

sensing a voltage feedback signal proportional to the voltage at the output terminal;

generating an error signal corresponding to a difference between the voltage feedback signal and a voltage reference; and combining the error signal with a compensation signal to produce a compensated error signal;

wherein the voltage output signal condition occurs when the compensated error signal attains a prescribed voltage level.

4. In a circuit comprising an inductor having first and second terminals, a first switch connected between the first inductor terminal and an input terminal, a second switch connected between the first inductor terminal and a common connection, a third switch connected between the second inductor terminal and the common connection, a fourth switch connected between the second inductor terminal and an output terminal, and a sensing element for sensing inductor current, the sensing element connected between the common connection and a node joining the second switch and the third switch, a method for regulating the voltage at the output terminal at a level greater than the voltage at the input terminal, the method comprising the steps of:

generating a repetitive clock signal;

setting the first switch to an on state and the second and fourth switches to an off state;

in response to each clock signal, turning the third switch on;

sensing inductor current;

in response to the sensed current rising to a boost mode threshold level, turning the third switch off;

in response to an output voltage condition, after the third switch turns off, turning on the second and fourth switches and turning off the first switch.

5. A method as recited in claim 4, further comprising the steps of:
in response to sensed current falling to a buck mode threshold level after turnoff of the third switch, turning the second switch off and the first switch on; and
turning the fourth switch off at the beginning of the next clock.

6. A regulator comprising:
an inductor having first and second terminals;
a first switch connected between the first inductor terminal and an input terminal;
a second switch connected between the first inductor terminal and a common connection;
a third switch connected between the second inductor terminal and the common connection;
a fourth switch connected between the second inductor terminal and an output terminals,
a sensing element for sensing inductor current, the sensing element connected between the common connection and a node joining the second switch and the third switch, and
a control circuit configured to:
set the second and third switches to an off state and the fourth switch to an on state prior to receipt of a clock signal pulse;
upon receipt of the clock signal pulse, set the first switch to an off state and the second switch off for a fixed time period;
in response to the sensed inductor current exceeding a first predetermined threshold level during the fixed time period, turn on the second switch after the fixed time period;
turn off the second switch when current falls below a second predetermined threshold level; and
maintain the first switch off until an output voltage condition occurs.

7. A regulator as recited in claim 6, wherein the control circuit is further configured to:
turn on the first switch upon occurrence of the output voltage condition; and
maintain the first switch on until the another clock signal pulse is received.

8. A regulator as recited in claim 7, further comprising:
an error amplifier having a first input for receiving a voltage feedback signal proportional to the voltage at the output terminal and a second input for receiving a voltage reference signal to produce an error signal output; and
a compensation circuit for generating a signal for compensating the error signal; and
wherein the voltage output signal condition occurs when the compensated error signal attains a prescribed voltage level.

9. A regulator comprising:
an inductor having first and second terminals;
a first switch connected between the first inductor terminal and an input terminal;
a second switch connected between the first inductor terminal and a common connection;
a third switch connected between the second inductor terminal and the common connection;
a fourth switch connected between the second inductor terminal and an output terminal,
a sensing element for sensing inductor current, the sensing element connected between the common connection and a node joining the second switch, and the third switch, and
a control circuit configured to:
set the first switch to an on state and the second and fourth switches to an off state;
in response to receipt of a clock signal pulse, turn the third switch on;
in response to inductor current rising to a boost mode threshold level, turn the third switch off, and
in response thereafter to an output voltage condition, turn on the second and fourth switches and turn off the first switch.

10. A regulator as recited in claim 4, wherein the control circuit is further configured to:
after turnoff of the third switch, turn the second switch off and the first switch on when inductor current falls to a buck mode threshold level; and
turn the fourth switch off upon receipt of another clock signal pulse.

* * * * *